(12) United States Patent
Kleinrouweler et al.

(10) Patent No.: US 12,143,910 B2
(45) Date of Patent: Nov. 12, 2024

(54) SYSTEMS, DEVICES AND METHODS FOR EDGE NODE COMPUTING

(71) Applicants: Koninklijke KPN N.V., Rotterdam (NL); Nederlandse Organisatie Voor Toegepast Natuuwetenschappelijk Onderzoek TNO, 's-Gravenhage (NL)

(72) Inventors: Jan-Willem Martin Kleinrouweler, Pijnacker (NL); Alexandre Da Silva Pratas Gabriel, The Hague (NL)

(73) Assignees: KONINKLIJKE KPN N.V., Rotterdam (NL); NEDERLANDSE ORGANISATIE VOOR TOEGEPAST-NATUURWETENSCHAPPELIJK ONDERZOEK TNO, 'S-Gravenhage (NL)

( * ) Notice: Subject to any disclaimer, the term of this patent is extended or adjusted under 35 U.S.C. 154(b) by 174 days.

(21) Appl. No.: 17/756,424

(22) PCT Filed: Dec. 28, 2020

(86) PCT No.: PCT/EP2020/087903
§ 371 (c)(1),
(2) Date: May 25, 2022

(87) PCT Pub. No.: WO2021/136753
PCT Pub. Date: Jul. 8, 2021

(65) Prior Publication Data
US 2023/0007457 A1    Jan. 5, 2023

(30) Foreign Application Priority Data

Dec. 30, 2019  (EP) .................................. 19219952
Apr. 17, 2020  (EP) .................................. 20170028

(51) Int. Cl.
*G06F 15/173*  (2006.01)
*H04L 67/1014*  (2022.01)
(Continued)

(52) U.S. Cl.
CPC ........... *H04W 4/50* (2018.02); *H04L 67/1014* (2013.01); *H04L 67/146* (2013.01);
(Continued)

(58) Field of Classification Search
CPC ... H04W 4/50; H04W 76/10; H04W 28/0226; H04W 28/16; H04W 40/20; H04L 67/1014; H04L 67/01; H04L 67/146
(Continued)

(56) References Cited

U.S. PATENT DOCUMENTS 6,014,090 A  *  1/2000  Rosen .................... H04W 4/02
                                                    455/524
8,244,874 B1     8/2012  Thireault
(Continued)

FOREIGN PATENT DOCUMENTS

GB       2477092 A        7/2011
JP       2012-174001      9/2012
(Continued)

OTHER PUBLICATIONS

3rd Generation Partnership Project (3GPP), *Service requirements for next generation new services and markets*, TS 22.261, v16.3.0 (Mar. 2018).
(Continued)

Primary Examiner — Kaylee J Huang
(74) Attorney, Agent, or Firm — Hamilton, Brook, Smith & Reynolds, P.C.

(57) ABSTRACT

Some embodiments are directed to a session manager, a cloud service system, and a mobile device. The session manager may be configured for managing an edge comput-
(Continued)

ing resource in a mobile network, wherein the mobile network comprises edge nodes which are configurable to provide edge computing resources to mobile devices. The session manager may generate a session identifier for the mobile device and associate the session identifier with the mobile device. Later, the session manager may receive a request from the cloud service system for deployment of an edge computing resource for the mobile device on an edge node.

13 Claims, 5 Drawing Sheets

(51) Int. Cl.
  *H04L 67/146* (2022.01)
  *H04W 4/50* (2018.01)
  *H04W 28/02* (2009.01)
  *H04W 28/16* (2009.01)
  *H04W 40/20* (2009.01)
  *H04W 76/10* (2018.01)

(52) U.S. Cl.
  CPC ....... *H04W 28/0226* (2013.01); *H04W 28/16* (2013.01); *H04W 40/20* (2013.01); *H04W 76/10* (2018.02)

(58) Field of Classification Search
  USPC ........ 709/226, 223, 224, 221, 220, 222, 227
  See application file for complete search history.

(56) References Cited

U.S. PATENT DOCUMENTS

| | | | | |
|---|---|---|---|---|
| 8,478,899 | B2* | 7/2013 | Gan | H04L 51/58 |
| | | | | 709/238 |
| 9,549,388 | B2* | 1/2017 | Reed | H04W 24/02 |
| 9,948,544 | B2 | 4/2018 | Strijkers et al. | |
| 2006/0031562 | A1 | 2/2006 | Satomi | |
| 2010/0169477 | A1 | 7/2010 | Stienhans et al. | |
| 2012/0166627 | A1* | 6/2012 | Kraiman | H04L 43/12 |
| | | | | 709/224 |
| 2012/0173686 | A1 | 7/2012 | Doyle et al. | |
| 2015/0381766 | A1 | 12/2015 | Yoshida | |
| 2018/0263039 | A1* | 9/2018 | Fang | H04W 72/53 |
| 2020/0120446 | A1 | 4/2020 | Stammers et al. | |
| 2020/0274935 | A1* | 8/2020 | Lekontsev | H04L 61/50 |

FOREIGN PATENT DOCUMENTS

| | | |
|---|---|---|
| JP | 2012-247865 | 12/2012 |
| WO | WO 02/095605 A1 | 11/2002 |
| WO | WO 2012/132808 | 4/2012 |
| WO | WO 2017/121478 A1 | 7/2017 |
| WO | WO 2019/061188 A1 | 4/2019 |
| WO | WO 2019/118964 A1 | 6/2019 |
| WO | WO 2020/069036 A1 | 4/2020 |

OTHER PUBLICATIONS

3GPP, *Technical Specification, 3rd Generation Partnership Project; Technical Specification Group Services and System Aspects; Management and orchestration; Concepts, use cases and requirements*, TS 28.530, v16 (Sep. 2019).
ETSI GS NFV-MAN 001 V1.1.1 (Dec. 2014), *Network Functions Virtualisation (NFV); Management and Orchestration*, (Dec. 2014).
3GPP TS 23.501 V15.1.0, 3rd Generation Partnership Project; Technical Specification Group Services and System Aspects; System Architecture for the 5G System; Stage 2 (Release 15) (Mar. 2018).
3GPP TS 23.501 V16.2.0, 3rd Generation Partnership Project; Technical Specification Group Services and System Aspects; System Architecture for the 5G System; Stage 2 (Release 16) (Sep. 2019).
Kekki, S., et al., "MEC in 5G Networks," ETSI White Paper No. 28, First Edition (Jun. 2018).
Satyanarayanan, M., et al., "The Case for VM-Based Cloudlets in Mobile Computing," *IEEE Pervasive Computing*, vol. 8, No. 4, pp. 14-23, Oct. 1, 2009.
European Search Report for European Application No. EP 20170028.3, titled: Systems, Devices and Methods for Edge Node Computing, Dated: Sep. 28, 2020.
International Search Report and Written Opinion for Int'l Application No. PCT/EP2020/087903, titled: Systems, Devices and Methods for Edge Node Computing, Dated: Feb. 3, 2021.

* cited by examiner

SYSTEMS, DEVICES AND METHODS FOR EDGE NODE COMPUTING

This application is the U.S. National Stage of International Application No. PCT/EP2020/087903, filed on Dec. 28, 2020, which designates the U.S., published in English, and claims priority under 35 U.S.C. § 119 or 365(c) to European Application No. 19219952.9, filed on Dec. 30, 2019 and European Application No. 20170028.3, filed on Apr. 17, 2020. The entire teachings of the above applications are incorporated herein by reference.

FIELD

The presently disclosed subject matter relates to a session manager, a cloud service system, a mobile device, a session management method, a cloud service method, a mobile device method, and a computer readable medium.

BACKGROUND

One form of edge computing is disclosed in ETSI White Paper No. 28 titled "MEC in 5G networks", by Sami Kekki et al. (ISBN No. 979-10-92620-22-1). The document is included herein by reference. Also further, 3gpp, and MEC references may be found in this document.

Edge computing improves cloud computing as it brings application hosting from centralized data centers down to the network edge, closer to consumers and the data generated by applications. This may improve latency and bandwidth efficiency. 5G networks based on the 3GPP 5G specifications are a key future target environment for MEC (Multi-access Edge Computing) deployments.

In the 5G system specification there are two options available for the architecture; one with the traditional reference point and interface approach and the other where the core network functions interact with each other using a Service Based Architecture (SBA). The SBA option of the 5G system architecture is shown in FIG. 1. FIG. 1 in this document has been adapted from FIG. 2 in the document cited above.

With the SBA, there are functions that consume services and those that produce services. Any network function can offer one or more services. In FIG. 1 the 3GPP 5G system with its SBA is shown on the left, while the MEC system architecture is on the right.

For example, shown on the left is the Access and Mobility Management Function (AMF) that handles mobility related procedures. With the SBA, the AMF provides communication and reachability services for other network functions (NFs) and it also allows subscriptions to receive notifications regarding mobility events. Similar to the AMF, the Session Management Function (SMF) may provide many functions, e.g., session management, IP address allocation and management, etc.

A User Plane Function (UPF) may play a role in integrating MEC deployment in a 5G network. UPFs can be seen as a distributed and configurable data plane from the MEC system perspective. Consequently, in some specific deployments the local UPF may be part of the MEC implementation. For example, a mobile device may connect via the RAN to a UPF located next to the MEC infrastructure, e.g., an edge node. A UPF can be (re)configured to route traffic to an edge node.

In the MEC system on the right-hand side of FIG. 1 the MEC orchestrator is a MEC system level functional entity that may act as an application function (AF). The MEC infrastructure, e.g., an edge node, may be deployed on the N6 reference point, e.g., in a data network (DN) external to the 5G system. This is enabled by flexibility in locating the UPF.

Logically MEC hosts are deployed in the edge or central data network and it is the User Plane Function (UPF) that takes care of steering the user plane traffic towards the targeted MEC applications in the data network. The locations of the data networks and the UPF are a choice of the network operator and the network operator may choose to place the physical computing resources based on technical and business parameters, etc.

SUMMARY

It would be advantageous to improve aspects of allocating edge computing resources. For example, it would be advantageous if a cloud service could allocate computing resources on an edge node if needed. The systems and devices may be advantageously implemented in the context of edge computing in a 5G network, but this is not necessary.

A session manager is provided configured for managing an edge computing resource in a mobile network. The mobile network may comprise edge nodes which are configurable to provide edge computing resources to mobile devices. The mobile device may be a so-called user device, or user equipment. For example, a mobile device may be a mobile phone, or a vehicle, or an internet-of-things device, and so on. The session manager may be implemented as a device or as a system. The session manager may run on one or more virtual machines and so on. The session manager may be implemented as an application function (AF) in the mobile network, e.g., an application function in a 5G mobile network.

The session manager may be a stand-alone system. The session manager may be comprised in an edge computing manager. The edge computing manager may be configured to start a virtual machine on the edge node, the virtual machine supporting the edge computing resources for the mobile device on the edge node. The edge computing manager may be configured to instruct the mobile network to configure traffic routing from the mobile device to the edge node. For example, the edge computing manager may be MEC Orchestrator. The configuring traffic routing may be done by configuring a UPF. For example, MEC orchestrator may generate a configuration message instructing the mobile network for the action.

A mobile device may use a cloud service over a data network from a cloud service system. For example, the mobile device may connect to the cloud service system to obtain the cloud service. The cloud service may perform a task on behalf of the mobile device, which can be taken over by edge computing at least in part. For example, the data network may be a computer network, e.g., the Internet. The cloud service system may use the session manager to deploy additional edge computing resources dynamically, e.g., when needed. The cloud service system may be implemented as a single device, e.g., a single server. The cloud service system may be implemented as a system comprising multiple devices, e.g., a multiple servers. For example, the multiple servers may be distributed over a geographical region, e.g., to improve latency and/or bandwidth.

The session manager, cloud service system and mobile device may communicate with each other over the data network. For example, they may have a corresponding data network interface, e.g., to exchange data messages over the data network as needed. The session manager, cloud service system and mobile device may comprise a processor system configured for their respective functions. For example, a processor system may comprise one more microprocessors configured for said functions.

The session manager and mobile device may cooperate to establish a session identifier. The session identifier may be used to identify the mobile device. For example, the mobile device may send a device identifier to the session manager that identifies the mobile device on a mobile network. The mobile network may be a 5G network such as based on the 3GPP 5G specifications, e.g., as described in 3GPP TS 23.501 V15.1.0, "3rd Generation Partnership Project; Technical Specification Group
Services and System Aspects; System Architecture for the 5G System; Stage 2 (Release 15)". The mobile network may support wireless communication, e.g., using multiple radio nodes or base stations. The device identifier may identify the mobile device on the mobile network. For example, the device identifier may be suitable to request location information of the mobile device. The device identifier may identify a connection between the mobile device, e.g., the user equipment, and the mobile network. For example, the device identifier may be a PDU session.

The mobile device may be configured with a data network address of the session manager. For example, the session manager data network address may be a fixed address on the mobile device, e.g., a configurable address. The session manager address may also be obtained dynamically. For example, when the mobile device signs up with the telecommunications network the session manager address may be obtained.
For example, the mobile device may be configured to connect to a network function in the mobile core network to obtain the correct session manager address; for example, this may be the AMF. For example, the mobile device may be configured to receive the session manager address via a signaling channel. A data network address, such as the data network address of the session manager, may be a URL or an IP address, or the like.

The session manager may receive the device identifier from the mobile device. For example, a device identifier such as a PDU session identifier may be received over the data network, e.g., over the Internet. For example, this may be sent from mobile device to session manager. For example, this may be the same identifier that a mobile device sends to a function of the mobile core network, when it registers on the mobile network. The session manager may then obtain a location of the mobile device in the mobile network using the device identifier. Requesting the location may also be done later, e.g., after a request for an edge computing resource has been received.

For example, the session manager may request the location of the mobile device from a location function in the mobile network, e.g., an AMF in the mobile network. A location of a mobile device in the mobile network may reflect the location of the mobile. For example, the location may provide information on the mobile device with respect to the mobile network so that an edge node may be selected with low-latency and/or high bandwidth.

For example, the location may comprise a radio node with which the mobile device may be connected in the mobile network. For example, the location may comprise a base station. A location may also comprise a group of radio nodes, e.g., a group of base stations. The radio nodes, base stations and groups thereof may be referred to by identifier. For example, a location may comprise a tracking area to refer to a group of base stations.

For example, in an embodiment, the session manager may comprise a mobile network interface configured to establish a connection with the mobile network. The session manager may obtain the location of the mobile device via the mobile network interface to the mobile network. For example, the mobile network interface may connect to network functions directly or via to a network access function, e.g., the Network Exposure Function (NEF) in a 5G network. One could make a further distinction between the mobile network and the mobile core network, where the mobile network contains the core network, and the core network is responsible for management and control of the mobile network.

Note that the cloud service system on its own, without support from the session manager, may not be able to obtain the location of mobile device. For example, identifying information for the cloud service may be a username and password which may not be known in the mobile network. Accordingly, the identity of the mobile devices as known to the cloud service manager may not match with the identity of the mobile devices as known in the mobile network.

The session manager may further be configured to generate a session identifier for the mobile device and to associate the session identifier with the mobile device. For example, the session manager may be configured to map the session identifier to the device identifier and location. For example, the associating or mapping may be done in a list, table database or other suitable data structure. The association and/or the session identifier may be temporary, e.g., expire, terminate or the like.

For example, the session identifier may be obtained by applying a function, e.g., a hash function, to the device identifier, location and/or further information. For example, the session identifier may be a random number. The further information may comprise an identifier of the cloud service system, so that a session identifier is different for a different cloud service. This has the consequence that a session identifier created for a first cloud service system may not work for a second cloud service system. The session identifier may be protected using a cryptographic algorithm. For example, the session identifier may comprise a cryptographic tag created with a secret key of the session manager. For example, the session identifier may be signed with a private key of the session manager.

The session manager may be configured to send the session identifier to the mobile device. The session identifier allows the data network level information and mobile network level information. For example, knowledge of the mobile network may include, e.g., its structure, it traffic. For example, knowledge of the data network may include, e.g., services used or requested by mobile devices, and relationships between mobile devices.

The session identifier may comprise the device identifier and/or location in recognizable form. However, in an embodiment, the device identifier and/or location cannot be determined from the session identifier by the cloud service system. For example, the mobile device may be configured to receive the session identifier and to forward the session identifier to the cloud service system. For example, as part of the connection, e.g., the cloud service connection, that the mobile device may have with the cloud service system.

One advantageous way to organize the mobile device is to put part of its functionality in an operating system and part in a cloud application. The cloud application refers to the part of the cloud application that runs on the mobile device, it may also be referred to as a cloud-enabled application. For example, the mobile device may be provided with an operating system that is configured to send the device identifier to the session manager that identifies the mobile device on a mobile network and to receive the session identifier from the session manager. For example, the cloud application may be configured to obtain the session identifier from the operating system and to send the session identifier to the cloud service system. For example, the operating system may handle the interactions with the session manager before an edge computing resource is initiated or before a need for an edge computing resource has arisen. The cloud application may be configured to handle interaction with the cloud service system. The mobile device part, e.g., the operating system part, configured to interface with the session manager may be referred to as the session handler.

The cloud service system may receive the session identifier from the mobile device. Note that the cloud service system could be the same entity as the mobile network operator, e.g., an MNO, or that the cloud service system may be located within the mobile network operator network, but neither is necessary. For example, the cloud service system may be a cloud service accessible via the public Internet.

The cloud service system may store the session identifier for later use, e.g., associated with login information of the mobile device or its user, the session identifier may also be used directly. For example, the cloud service systems may determine a need for an edge computing resource for the mobile device. There may be several situations in which such a need can arise. For example, the need may arise because of the particular application that the mobile device and/or cloud service engage in, e.g., a local live streaming, or so-called prosumer, application or a high-resource computing application, e.g., a GPU hired for a particular application, For example, the cloud service may be told by the mobile device of the need. It may also be that the need arises because congestion, in particular network congestion is detected. For example, in a content streaming application the network congestion may be detected after which an edge resource may alleviate the congestion. For example, determining a need may comprise detecting high storage or computation requirements or determining a peak in demand originating from a location in the data network, e.g., from a server location of the cloud service system, etc.

In any case, once the cloud service system determines that there is a need for an edge computing resource, then the cloud service system may send a request to the session manager for deployment of the edge computing resource for the mobile device on an edge node. The mobile device may be identified in the request through the session identifier. For example, the cloud service system may be configured to receive from the session manager a data network address of the initiated edge computing resource. For example, the cloud service system may receive the data network address from the mobile device, e.g., together with the session identifier. The session manager may validate the request from the cloud service system, e.g., to prevent fraud or check the agreements with the MNO or MEC provider. For example, the session manager may verify that it had indeed created the session identifier. For example, if the session identifier is cryptographically protected then said cryptographic protection may be verified. For example, if the session identifier is signed and/or comprises a tag, then the signature and/or tag may be verified with a key of the session manager, e.g., a public key corresponding to its private key.

When the session manager receives the request for an edge computing resource from the cloud service system, then the session manager may use the session identifier received with the request to obtain the device identifier and/or its location. The location of the mobile device in the mobile network may also be obtained at this point. Using the location, an edge node for the mobile device may be determined. Preferably, the edge node location is chosen so that latency and/or bandwidth is improved, e.g., compared to a connection to a server of the cloud service system.

For example, the session manager may be configured with a table indicating which edge node to use for which location. The table may be fixed, and/or predetermined. The table may also be dynamic. For example, an edge node may report to a session manager of its availability and location in the mobile network. Using the latter information a dynamic selection of a suitable, e.g., close, edge node may be selected. For example, the table may indicate how base stations are connected to edge nodes.

The table may also comprise the capabilities of the edge nodes; for example, if the edge node has a GPU(s), if it has storage capabilities, how much, etc. The request for resources may be matched to the available resources. For example, a request for a GPU, e.g., to train a neural network may first select an edge node on the availability of a GPU while latency may be less important. On the other hand for a content streaming application latency and storage capacity may be important selection criteria. The selection of the edge node may be made by or with the edge computing manager, e.g., a MEC orchestrator. A particular edge node may be requested from the edge computing manager, e.g., by the session manager. Edge nodes may be organized in groups. In this case, a group instead of a particular edge node may be selected, e.g., by the session manager or edge computing manager.

The edge computing resource for the mobile device on the edge node is initiated, for example, through an edge computing manager, for example, a MEC Orchestrator. It is convenient if the session manager is part of the MEC Orchestrator, but this is not needed; the session manager may be a stand-alone device or system. For example, session manager and edge computing manager may cooperate through an internal or external API. For example, session manager and edge computing manager may cooperate by exchanging messages, e.g., through the data network, or through an internal interface.

The edge computing resource may be initiated on an existing virtual machine, or a new virtual machine may be started. For example, the session manager may be configured, e.g., informed, by the cloud service system, with an image of a virtual machine to start on the edge node; the session manager may also know that there already is an edge node active that can be used. The image may be provided as a data network address, e.g., a URL, or the image itself may be provided, and so on. For example, cloud service system may provide the session manager one or more session identifiers and with a reference to one or more resources which are requested. This reference may be an image name to be downloaded from a common repository, e.g., a Docker Hub in the case that the image is a Docker container, or a URL where the image can be downloaded, etc. The image may also be referenced by an image identifier, which may already be available at the edge node and associated with the image identifier.

Once the edge computing resource has been initiated, traffic may be sent to the resource. There are several ways to implement this. For example, the session manager may send a data network address of the initiated edge computing resource on the edge node to the cloud service system. The data network address may be a URL or an IP address, a port address, and the like. The cloud service system may then send the address to the mobile device. The cloud service system may configure the edge node resource if needed.

The mobile device may receive the data network address of the initiated edge computing resource, e.g., from the cloud service system, and connect to the resource. It is also possible to redirect traffic from the mobile device without having the mobile device receive the data network address of the initiated edge computing resource. For example, a reconfiguration message may be sent to a routing interface from the mobile network to the data network. The routing interface may be associated with the mobile device and/or the edge node to route traffic to the initiated edge computing resource. For the router or router interface may be a user plane function (UPF) of the mobile network, e.g., a UPF of a 5G network.

For example, the additional resource may be transparent or mostly so to the cloud service system and/or to the mobile device. For example, the mobile device may continue to use the same data network address which is now routed to a new edge node resource. For example, the mobile device and/or the cloud service system may be configured to establish a new connection to a new address, e.g., to explicitly connect to the edge node resource. In the latter case, no rerouting may be needed. Hybrid solutions are possible.

Determining a need for the edge computing resources may be difficult for the cloud service system, especially for congestion related needs. This problem may be alleviated by the session manager. For example, the session manager may be configured to collect mobile network level information for the cloud service system from the mobile network to indicate network congestion to the cloud service system. For example, the session manager may notify the cloud service system about the network congestion.

For example, the cloud service system may be configured to send a request to the session manager for information indicating mobile network congestion. The request may comprise data network information identifying one or more network flows to servers of the cloud service system. For example, a network flow may be identified with a traffic description, e.g., a so-called five-tuple. The session manager may request the information from the mobile network and send a network congestion report, e.g., when network congestion is detected for a particular server of the cloud service system. The cloud service system may select one or more mobile devices connected to the server, and send a request for deployment of the edge computing resource for the one or more mobile devices.

Interestingly, this may be implemented as a subscription. For example, the cloud service system may subscribe to a notification from the session manager about network congestion. The cloud service system may provide network level information, e.g., with one or more data network addresses, such as a list of IP addresses and port numbers, which are used by the cloud service system. When network congestion is detected, the session manager may inform the cloud service system of the servers, e.g., of the data network addresses, that are causing the network congestion, e.g., by means of a notification. Following the notification, the cloud service system may select one or more mobile devices as suitable candidates for edge computing, and instantiate edge computing.

In an embodiment, a cloud service system may be configured to measure latency and/or bandwidth for one or more devices, e.g., by exchanging messages between the cloud service system and mobile devices. For example, one could measure a round trip time for a message send form the cloud service system to a mobile device and back. For mobile devices with poor performance on a quality metric such a latency or bandwidth an edge computing resource may be requested. For example, multiple such mobile devices may be identified and combined in a single request. The session manager may then select an edge node which would improve the quality metric, e.g., on the average.

The cloud service system may include in its request multiple session identifiers. For example, the request may comprise multiple session identifiers identifying multiple mobile devices. The session manager may receive multiple session identifiers from the cloud service system. For example, the multiple mobile devices associated with the multiple session identifiers may be configured for data exchange among the multiple mobile devices. An edge computing resource may be deployed to do the data exchange through the edge computing resource, e.g., to improve latency and/or bandwidth. For example, the mobile device may be configured for a prosumer application. For example, the mobile device may be configured as sensors and may locally compute on the edge computing resource on the sensor values before forwarding the computations results, e.g., to the cloud service system.

The session manager may select the edge node in dependence on the multiple locations associated with the multiple session identifiers. For example, a new resource may be instantiated, or an existing resource may be used.

For example, the cloud service system may provide the session manager with session identifiers for mobile devices selected for edge computing, and the relation between the mobile devices. A mapping between related mobile devices and the edge nodes may be computed, e.g., optimized. For example, in an embodiment, the cloud service system may make a list of mobile devices that ideally would be connected to the same edge node. For example, in an embodiment, the cloud service system may use graph-based definitions. For example, when an API between the session manager and the cloud service system uses JSON for formatting body content, the relations between the mobile devices can be expressed using the JSON Graph Format (JGF).

For example, if two or more mobile devices have a location at or near the same edge node, the edge computing resource may be deployed at that edge node. For example, if the two or more mobile devices do not have a common location, the edge node may be located in between and/or at a central location, or the system may revert back to using a server of the cloud service system. For example, two mobile device may be connected on application level, e.g., an uploader and downloader.

The multiple mobile device may belong to a common group of base stations, e.g., a tracking area. Note that a cloud service system will typically not have knowledge of tracking areas and the like. The session manager may have this knowledge though. For example, session manager and/or edge computing manager may have a table indicating the edge nodes that belong to a particular tracking area. The session manager may use the information to select an edge node, but may also do this together with the edge computing manager.

Selecting an edge node for multiple mobile devices may be done by estimating an improvement in a relevant metric, e.g., latency, and selecting the edge node which would give the most improvement, e.g., on the average. The average may be weighted, e.g., on the basis of the application, service level, data consumption and the like. For example, an edge node may be selected that is associated to the base station of the most mobile devices. For example, $n_1$ mobile devices may be associated with base station 1, $n_2$ with base station 2 and so on. An edge computing resource may initiated on an edge node i corresponding to a base station i with the highest value $n_i$. Instead of selecting the majority, the edge node may be selected that would minimize a loss function, e.g., $\Sigma l_i n_i$, wherein $l_i$ represents the latency that would be obtained if that particular edge node was selected. After initiating the edge computing resource a next iteration may be performed and a further edge computing resource may be initiated.

There may be several reasons why a cloud service system may include multiple session identifiers in a request. For example, a peak in demand may be detected originating from a location in the mobile network associated with the multiple mobile devices.

For example, the cloud service system may determine a peak in demand originating from a particular server instance of the cloud service system to which the multiple mobile devices connect. For example, a content item, say a video may already be distributed per region, so if a region, say region Amsterdam, has a lot of demand, then an additional edge node resource at that location will help. This allows one to dynamically split up a server. For example, a content streaming application may use such an embodiment.

For example, in a prosumer case, all content may be hosted on a particular server. All traffic is filmed and consumed at one location. The corresponding location may then be used to allocate an edge node.

For example, the cloud service system may determine a common location of the multiple mobile devices from data network addresses used by the multiple mobile devices. For example, a common location may be determined from the source IP addresses of the mobile devices reaching the cloud service system.

For example, the cloud service system may receive geographical information from the mobile devices and determine a peak in demand originating the multiple mobile devices having matching geographical information. For example, users may enter in an application on the mobile device where they are located. For example, they may send coordinates, e.g., GPS coordinates, or a city, or an address, etc. For example, the application may be a navigation application and the edge node may be used to store navigation information, e.g., augmented reality information.

For example, the cloud service system may receive location information for the mobile devices in the mobile network and determining a peak in demand originating from the multiple mobile devices having matching location information. For example, the location information may comprise mobile network parameters, such as the Tracking Area or Cell identifier, e.g., 5G parameters. For example, the information may be obtained by the mobile device and sent to the cloud service system. For example, the mobile device may provide an API to make the information available, e.g., an operating system call. This may be implemented in a telephony API. For example, the mobile device, e.g., the session handler, may obtain access to the location information.

In an embodiment, location information is obfuscated before it made available, e.g., available outside of the operating system of the mobile device. For example, the API may hash it, e.g., together with a key or string, etc. In this way, location information may be used for allocation of edge node resources without having to make the location information visible on an API of the mobile device. Alternatively, the information may be obtained through the session manager, who may in turn receive it from the telecommunications network. For example, the location information may be encrypted with a key of the session manager, e.g., a public key.

The session manager may be configured to receive a terminate message from the mobile device or cloud service system to terminate the initiated resources. Terminating an edge computing resource may be done through the edge computing manager, e.g., the MEC orchestrator. The edge computing manager and the session manager may be combined, e.g., one comprised in the other.

In another embodiment, the edge computing resource is used by multiple mobile devices. In this case, the edge computing manager, e.g., MEC Orchestrator might only terminate the edge computing resource, e.g., the VM on which it runs, when they are no longer used by any mobile device, or when the cloud service system provides the instructions to terminate the resource. The session manager and/or edge computing manager may keep track of how many mobile device are still using an edge computing resource and this information may be used to terminate the resource, e.g., when the number of users is zero or below a threshold. This may be application specific. For example, this may be determined by the party that operates the edge computing manager, the edge node, MEC orchestrator and/or cloud service.

For example, in an embodiment the edge computing manager and/or session manager may be configured to maintain a list of mobile devices that use an edge computing resource, and/or to terminate the edge computing resource if the list is empty or below a threshold.

The edge computing manager, e.g., a MEC Orchestrator may control one or more edge nodes. For example, the edge computing manager may comprise edge node information indicating the location of the edge nodes. For example, the edge computing manager may be configured to verify infrastructure in a region, and/or to start the infrastructure, e.g., the edge node(s). For example, a session manager may interact with the edge computing manager to initiate edge computing for a specified mobile device, e.g., on a specified edge node, e.g., using a specified image and/or resource. The edge computing manager may be configured to check if deployment of a new VM is necessary. For example, there may already be a VM running that can be used by the mobile device. For example, multiple mobile devices may use the same VM. If needed, or instructed, the edge computing manager may instantiate a new VM on an edge node. For example, the edge node may be selected for good bandwidth and/or low latency. For example, the edge node may be selected for load balancing, e.g., using a round robin scheme.

The edge computing manager may be configured to reconfigure a routing interface, e.g., the UPF. The edge computing manager may be configured to interact with the mobile network to reconfigure the UPF. For example, the edge computing manager may send information, e.g., in the form of a traffic description, to configure a UPF. For example, a traffic description may be a five-tuple, but other filters are also possible. In a 5G network this may go through an AMF and/or SMF, but this is not necessary—fewer or more intermediates are possible. The edge computing manager may select a UPF and configure traffic routing to the edge node.

The edge computing manager may be located in the data network and may connect to the mobile network via a reference point, e.g., the N6 reference point; For example, to configure the mobile network, the edge computing manager may connect to the mobile core network via the interfaces from the service based architecture, e.g., the Nnef or the Namf.

The edge node may be located close to a base station. In one embodiment, the edge computing manager deploys a service on the edge node located closest to the mobile device; although this selection may have been made by the session manager.

The devices and systems are electronic devices and systems.

Further aspects include methods, including a session manager method, a cloud service method and mobile device method. An embodiment of the methods may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all or part of the steps of an embodiment of the method when the computer program is run on a computer. Preferably, the computer program is embodied on a computer readable medium. Another aspect of the presently disclosed subject matter is a method of making the computer program available for downloading.

BRIEF DESCRIPTION OF THE DRAWINGS

Further details, aspects, and embodiments will be described, by way of example only, with reference to the drawings. Elements in the figures are illustrated for simplicity and clarity and have not necessarily been drawn to scale. In the figures, elements which correspond to elements already described may have the same reference numerals. In the drawings, FIG. 1a schematically shows an example of an embodiment of a mobile network and a MEC system, FIG. 1b schematically shows an example of an embodiment of a MEC system, FIG. 2a schematically shows an example of an embodiment of a session manager, FIG. 2b schematically shows an example of an embodiment of a cloud service system, FIG. 2c schematically shows an example of an embodiment of a mobile device, FIG. 2d schematically shows an example of an embodiment of an edge computing system, FIG. 3a schematically shows an example of an embodiment of an edge computing system, FIG. 3b schematically shows an example of an embodiment of an edge computing system, FIG. 4 schematically shows an example of an embodiment of a session management method, FIG. 5 schematically shows an example of an embodiment of a cloud service method, FIG. 6 schematically shows an example of an embodiment of a mobile device method, FIG. 7a schematically shows a computer readable medium having a writable part comprising a computer program according to an embodiment, FIG. 7b schematically shows a representation of a processor system according to an embodiment.

LIST OF REFERENCE SIGNS AND ABBREVIATIONS

Figure 1A:
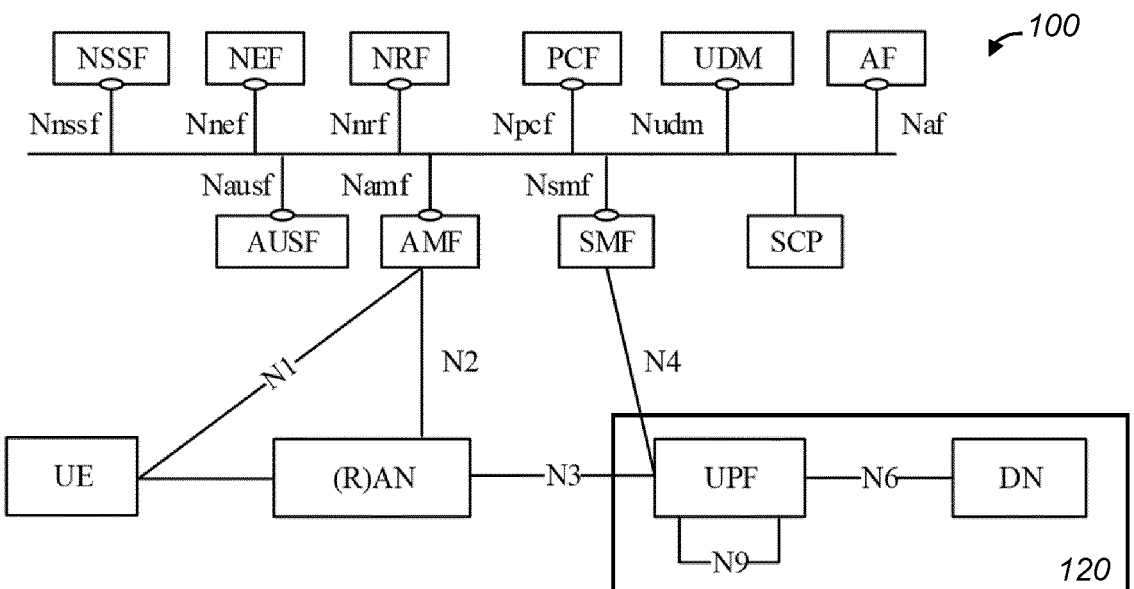

The following list of references and abbreviations is provided for facilitating the interpretation of the drawings and description and shall not be construed as limiting the claims.

3GPP 3rd Generation Partnership Project
4G, 5G 4th, 5th generation of mobile networks
AF Application Function
AMF Access and Mobility Management Function
API Application Programming Interface
APP Application
AUSF Authentication Server Function
CN Core Network
ETSI European Telecommunications Standards Institute
IoT Internet of Things
IP Internet Protocol
MEC Multi-access Edge Computing
MEP MEC Platform
MNO Mobile Network Operator
NEF Network Exposure Function
NFV Network Functions Virtualization
NSSF Network Slice Selection Function
NRF Network Repository Function
PCF Policy Control Function
RAN Radio Access Network
RD Retained Data
SBA Service Based Architecture
SCP Service Communication Proxy
SMF Session Management Function
UDM Unified Data Management
UE User Equipment
UPF User Plane Function
120 a MEC system
122, 123 an App
121 a virtualization infrastructure
124, 125 a service
126 a MEC platform
127 a MEC platform manager
130 a MEC orchestrator
141 a system level
142 a distributed host level
211 a session manager
212 a cloud service system
213 a mobile device
231-233 a processor system
241-243 a memory
251-253 a communication interface
270 a data network
R1-R5 an interface
310 a user equipment
312 an application instance
314 a session handler
320 a cloud service
342 a session AF
344 a MEC orchestrator
350 cloud
1000 a computer readable medium
1010 a writable part
1020 a computer program
1110 integrated circuit(s)
1120 a processing unit
1122 a memory 1124 a dedicated integrated circuit
1126 a communication element
1130 an interconnect
1140 a processor system

DETAILED DESCRIPTION OF EMBODIMENTS

While the presently disclosed subject matter is susceptible of embodiment in many different forms, there are shown in the drawings and will herein be described in detail one or more specific embodiments, with the understanding that the present disclosure is to be considered as exemplary of the principles of the presently disclosed subject matter and not intended to limit it to the specific embodiments shown and described.

In the following, for the sake of understanding, elements of embodiments are described in operation. However, it will be apparent that the respective elements are arranged to perform the functions being described as performed by them.

Further, the subject matter that is presently disclosed is not limited to the embodiments only, but also includes every other combination of features described herein or recited in mutually different dependent claims.

The following some embodiments are described in the context of a telecommunication network adhering to one or more 5G 3GPP and related standards, for example as defined by [1] to [4]. However, the concepts described in the following embodiments may equally apply, mutatis mutandis, to any other type of telecommunication network having a network management system, a slice management system and a network virtualization system as defined by the wording of the appended claims.

REFERENCES

[1] 3rd Generation Partnership Project (3GPP), *Service requirements for next generation new services and markets*, TS 22.261, v16.3.0
[2] 3GPP, *Technical Specification, 3rd Generation Partnership Project; Technical Specification Group Services and System Aspects; Management and orchestration; Concepts, use cases and requirements*, TS 28.530, v16
[3] ETSI GS NFV-MAN 001 V1.1.1 (2014 December), *Network Functions Virtualisation (NFV); Management and Orchestration* 3GPP TS 23.501 V15.1.0, "3rd Generation Partnership Project; Technical Specification Group Services and System Aspects; System Architecture for the 5G System; Stage 2 (Release 15)
[4] 3GPP, System Architecture for the 5G System (5GS) Stage 2 (Release 16), September 2019

Figure 1B:
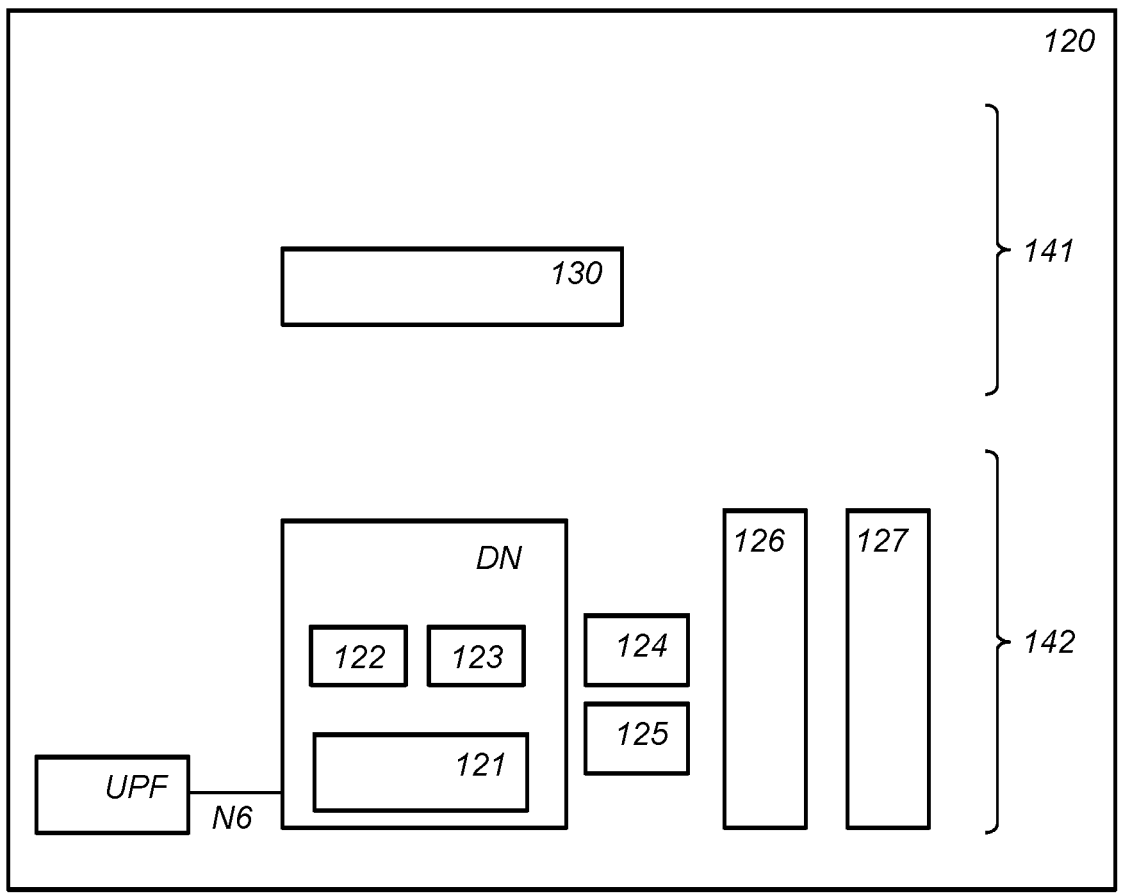

FIG. 1a schematically shows an example of an embodiment of a mobile network 100 and a MEC system 120. FIG. 1b schematically shows an example of an embodiment of a MEC system 120. For example, the MEC system of FIG. 1b may be used to implement the MEC system of FIG. 100.

FIG. 1a shows possible implementation of a mobile network, in this case a 5G System architecture. FIGS. 1a and 1b show how a 3GPP 5G service based architecture and an ETSI MEC architecture may be integrated.

Conceptually, the MEC system 120 may be divided into a system level 141 and a distributed host level 142. On the system level, there may be a MEC orchestrator 130. On the distributed host level, various functions and the like may be implemented. For example, a virtualization infrastructure 121 may be present, which may support one or more apps; shown are apps 122 and 124. For example, a MEC platform 126 and/or a MEC platform manager 127 may be used. At the distributed host level there may be one or more services; shown in are services 124 and 125 For example, the MEC platform 126 and MEC platform manager 127 may be used by the MEC orchestrator 130 to initiate edge resources.

In an embodiment, a third-party Cloud Service may launch a service on a Multi-access Edge Cloud for one or more specific users of the Cloud Service. Such functionality may be used for a 5G mobile network, or for other types of mobile networks. An interface on the Mobile Network may allow the Cloud Service to initiate the deployment of the service on the Multi-access Edge Cloud and redirect UEs to the edge node in the network. Dynamically allocating edge computing resources provides advantages. For example, bandwidth may be increased or latency may be decreased when it is needed, thus improving service level with fewer resources. For example, a mobile device may obtain access to computing or storage resources when needed, e.g., for computing intensive tasks, e.g., processing data such a sensor data, using or training a neural network, storing data such as sensor data or content data, etc., and so on.

Edge computing may be a cloud-based networking architecture where computing and data storage resources are brought towards the edges of the network, near the end-users. Multi-access Edge Computing (MEC) is defined by the European Telecommunications Standards Institute (ETSI) Industry Specification Group. Embodiments may conform to this standard, or may conform in part. By running cloud applications closer to the end-user, network congestion can be avoided or the performance of the cloud application can be improved. MEC resources may be available at high-bandwidth, low latency, and with high availability. MEC may be used, e.g., for demanding networked applications in mobile networks.

In the MEC architecture, applications typically run in Virtual Machines (VMs) on a virtualized infrastructure. The infrastructure and management of the applications running on top of this infrastructure may be coordinated by the MEC Orchestrator. The MEC architecture may integrate at two points into the 3GPP 5G Service Based Architecture (SBA) as shown in FIG. 1b. The MEC orchestrator may act as an Application Function (AF) and can interact with other 5G Network Functions (NFs), either directly when the MEC Orchestrator is trusted, e.g., because it is operated by the Mobile Network Operator (MNO), or, via the Network Exposure Function (NEF).

Examples of relevant NFs are the Access and Mobility Management Function (AMF) which handles application mobility and the Session Management Function (SMF) which handles session management, IP address management, and control of the User Plane Function (UPF). The UPF is the interconnect point between the mobile network infrastructure and the data network (DN). The data network may be a local area network or a wide area network. Typically, the data network is the Internet. The UDF may act as the anchor point for the Protocol Data Unit (PDU) session. FIG. 1a shows possible relations between the components and NFs in the 5G SBA.

The MEC infrastructure, e.g., edge nodes, may be located in the data network and connect to the 5G mobile network via the N6 reference point. In a typical MEC deployment, the MEC infrastructure, e.g., the edge nodes, are located close to a based station, e.g., a 5G base station, e.g., a gNB. UEs, e.g., mobile devices, may connect via the RAN to a UPF located next to the MEC infrastructure. The MEC orchestrator, e.g., as AF, controls the UPF (re-)selection and traffic routing, such that a UE connects to the MEC infrastructure located near the UE. Conventionally, only when an application is running in a VM on the MEC infrastructure and the UPF are configured accordingly, can a UE can make use of the edge computing service. Because a PDU session in the 5G Core Network may have multiple N6 interfaces towards the data network, only specific traffic related to a selected application may be redirected to the MEC infrastructure.

For example, MEC use cases may be internet based and may include, for example, video analytics, virtual/augmented reality, internet of things, optimizing local content distribution, and local data caching. For example, such applications may be improved in terms of increased bandwidth, lowered latency, and higher-availability, With edge computing, UEs may obtain extended computing capabilities, while saving Internet bandwidth because the traffic between UE and MEC stays local.

In an embodiment, a cloud service system can initiate edge computing resource on an edge node when needed, e.g., dynamically. Many parties obtain advantages from such dynamic allocation. For example, the Mobile Network Operator (MNO), Cloud Service (CS), and end-user benefit from, e.g., traffic localization and computing in the MEC. Initiating edge computing resources, e.g., when a need therefore is detected may be used to avoid that the MEC system needs to host all available services, that UPFs are pre-selected, and that traffic routing for all applications to the MEC is configured.

For some use cases, for example the "prosumer" live streams, edge computing resources may only be beneficial when the number of users of this application at a certain location grows. This need may be detected, e.g., that the number of user from the location grows over a threshold, or that the bandwidth consumed local to a location exceed a threshold. Accordingly, edge computing resources may then be initiated. For example, both the detection of the need and initiating the edge node resources may be done by the cloud service, although this is not necessary. Thus is may be avoided that the cloud service has the MEC pre-configured. In practice pre-configuring of the MEC is often only done for large cloud services. But with dynamic allocation edge node resources can become available for smaller cloud services as well. In an embodiment, the cloud service is configured to dynamically instantiate resources on the MEC infrastructure for selected UEs.

For example, bandwidth savings can be accomplished by having content distributed via the MEC, e.g., via an edge node, to other UEs served by the same edge node. For example, this may be used in so-called prosumer application. In a prosumer application multiple users at a same location, e.g., served by the same edge node, both produce content for local consumption. For example, a prosumer application may be used during a crowded event allowing users to watch live streams created by other attendees of the same event.

A difficulty in dynamically allocation edge node resources, especially by the cloud service, is that the CS providers are typically unaware of the MEC infrastructure instances, e.g., network layout, 5G Core internal networking. For example, the CS has no means to identify the PDU session of a UE running a cloud application that interacts with the CS. On the other hand, the MEC orchestrator or other AFs/NFs in the 5G Core have no means to identify the application instances that interact with the CS. According to an embodiment, an identification exchange is created between the network and the CS.

For example, in an embodiment the MEC orchestrator may be configured to interface towards both the cloud application instances on the UE and with the CS. The MEC orchestrator can act as the bridge for the identification of UEs selected for edge computing. The cloud application instance, e.g., via a function on the UE, may establish a session with the MEC orchestrator, and obtain an identifier linked to this session. This identifier may be communicated to the CS, such that the cloud service, can instantiate edge computing for the UEs by referencing to the UEs using the communicated identifier. A MEC orchestrator which is positioned in the data network and which can interface with the mobile network is naturally positioned for this task. It is however not required, for example, a session manager may be configured to assign a session identifier. The session manager can then interface with the MEC orchestrator as needed. Using a separate session manager has the advantage that fewer changes are needed in the MEC orchestrator, which makes it easier to introduce this functionality in a network, especially an existing network. On the other hand integrating the session handler with the MEC orchestrator reduces complexity.

Figure 2A:
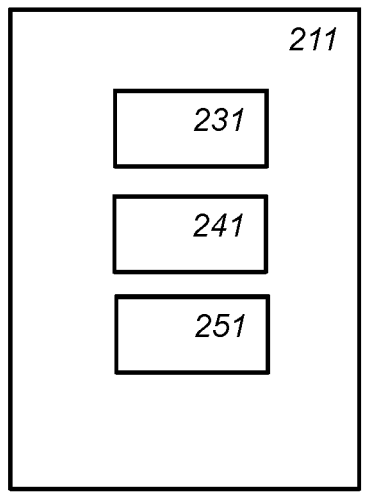
Figure 2B:
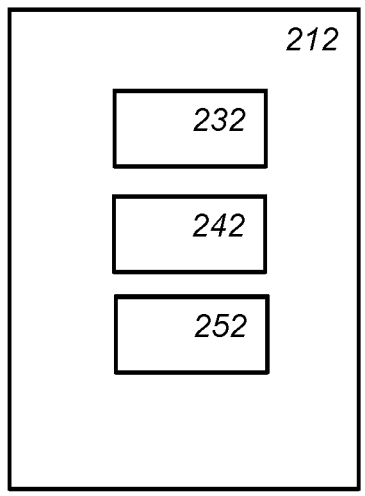
Figure 2C:
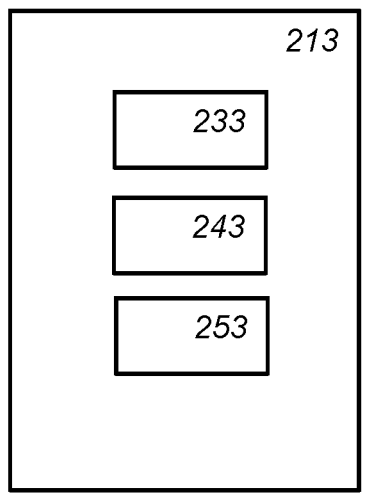

FIG. 2a schematically shows an example of an embodiment of a session manager 211. FIG. 2b schematically shows an example of an embodiment of a cloud service system 212. FIG. 2c schematically shows an example of an embodiment of a mobile device 213. For example, the cloud service system 212 may be a cloud service, e.g., a 'CS'. For example, the mobile device may be or comprise a user equipment, e.g., a 'UE'. For example, the session manager, may be or comprise a session AF or a MEC orchestrator.

For example, session manager 211 may be configured to generate a session identifier for mobile device 213 and associate the session identifier with the mobile device. The session identifier may be communicated with cloud service system 212, e.g., through mobile device 213. For example, cloud service system 213 may be configured to send a request to the session manager for deployment of the edge computing resource for the mobile device on an edge node, wherein the request identifies the mobile device with the session identifier. Session manager 211 may be configured to initiate an edge computing resource for the mobile device on an edge node, e.g., an edge node selected from the location of the mobile device.

Session manager 211, cloud service system 212 and mobile device 213 may comprise a processor system, e.g., processor system 231, 232, and 233 respectively.

Session manager 211, cloud service system 212 and mobile device 213 may comprise a memory, e.g., memory 241, 242, and 243 respectively.

Session manager 211, cloud service system 212 and mobile device 213 may comprise a communication interface, e.g., communication interface 251, 252, and 253 respectively.

Session manager 211, cloud service system 212 and mobile device 213 may be configured to communicate with a data storage, which may be local storage or cloud storage. Storage may be implemented as an electronic memory, say a flash memory, or magnetic memory, say hard disk or the like. Storage may comprise multiple discrete memories together making up the storage. Storage may comprise a temporary memory, say a RAM. The storage may be cloud storage.

Figure 2D:
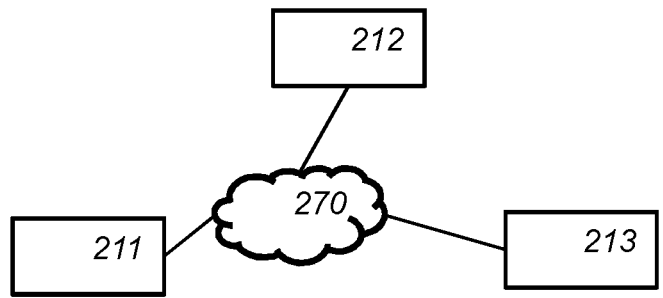

FIG. 2d schematically shows an example of an embodiment of an edge computing system. Session manager 211, cloud service system 212 and mobile device 213 may communicate with each other, external storage, input devices, output devices, etc., over a computer network 270. The computer network may be an internet, an intranet, a LAN, a WLAN, etc. The systems comprise a connection interface which is arranged to communicate within the system or outside of the system as needed.

The communication interface may differ as required, and may comprise one or multiple communication modalities. For example, the mobile device may comprise a wireless connector, e.g., an antenna, e.g., a Wi-Fi, 4G or 5G antenna. For example, the mobile network may connect through the mobile network to an interface to the data network. For example, the mobile device may establish a RAN connection to the UDF, and from there to the data network, e.g., the Internet. For example, the cloud service may comprise a wired or wireless interface to the data network, e.g., an Ethernet connection, etc. For example, the session manager may comprise an interface to the data network, but may also comprise an interface to the mobile network.

In addition to the connections shown in FIG. 2*d*, e.g., connection between session manager 211, cloud service system 212 and mobile device 213 through data network 270, there may also be connection to the mobile network. The latter may not go through the data network, or not completely. For example, mobile device 213 may be configured to connect to the mobile network; in fact its connection to the data network may go through the mobile network. For example, session manager 211 may connect to the data network, e.g., to obtain location information of the mobile device.

The execution of session manager 211, cloud service system 212 and mobile device 213 may be implemented in a processor system, e.g., one or more processor circuits, e.g., microprocessors, examples of which are shown herein. For example, a function may be implemented as a functional unit that may be a functional unit of the processor system. For example, the functional units may be wholly or partially implemented in computer instructions that are stored at the device or system 211, 212 and 213, in an electronic memory thereof, and are executable by a microprocessor thereof. In hybrid embodiments, a functional unit is implemented partially in hardware, e.g., as coprocessors, e.g., cryptographic coprocessors, and partially in software stored and executed on the device or system.

Session manager 211, cloud service system 212 and mobile device 213 may each be implemented as a single device. This is however not necessary, especially session manager 211, cloud service system 212 may be implemented as a system, e.g., a distributed system. All or parts of these may be implemented in a virtual machine. Especially, the session manager may be implemented in such a way.

Typically, the systems and/or devices comprise a microprocessor which executes appropriate software stored at the system; for example, that software may have been downloaded and/or stored in a corresponding memory, e.g., a volatile memory such as RAM or a non-volatile memory such as Flash. Alternatively, the systems may, in whole or in part, be implemented in programmable logic, e.g., as field-programmable gate array (FPGA). The systems may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL, etc.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Figure 4:
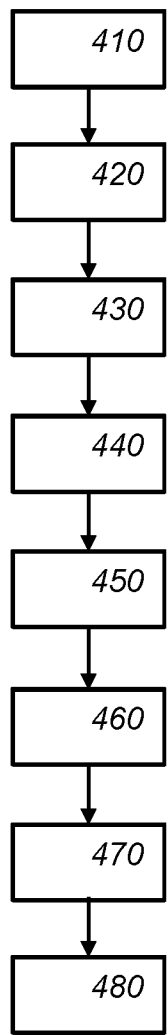

FIG. 4 schematically shows an example of an embodiment of a session management method 400. Method 400 is configured for managing an edge computing resource in a mobile network. The mobile network comprises edge nodes which are configurable to provide edge computing resources to mobile devices. The session management method 400 may comprise:

establishing (410) a connection with a mobile device and with a cloud service system, receiving (420) a device identifier from the mobile device that identifies the mobile device on the mobile network obtaining (430) a location of the mobile device in the mobile network using the device identifier, generating (440) a session identifier for the mobile device and associate the session identifier with the mobile device, sending (450) the session identifier to the mobile device, the mobile device being configured to forward the session identifier to the cloud service system, receiving (460) a request from the cloud service system for deployment of an edge computing resource for the mobile device on an edge node, wherein the request identifies the mobile device with the session identifier, selecting (470) an edge node for the mobile device in dependence on the location, initiating (480) the edge computing resource for the mobile device on the edge node.

Figure 5:
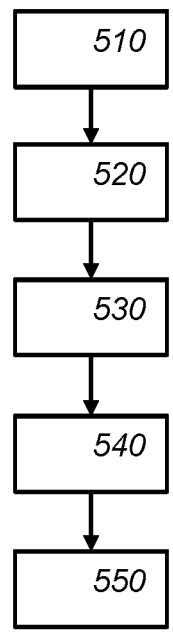

FIG. 5 schematically shows an example of an embodiment of a cloud service method 500. Method 500 may comprise establishing (510) a connection with a mobile device and with a session manager, and connecting (520) to the mobile device to provide a cloud service, receiving (530) a session identifier from the mobile device, the session identifier being associated to mobile device through the session manager, determining (540) a need for an edge computing resource for the mobile device, sending (550) a request to the session manager for deployment of the edge computing resource for the mobile device on an edge node, wherein the request identifies the mobile device with the session identifier.

Figure 6:
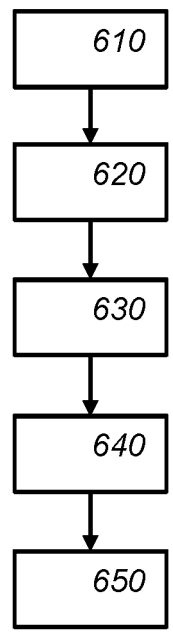

FIG. 6 schematically shows an example of an embodiment of a mobile device method 600. Method 600 may comprise establishing (610) a connection with a cloud service system and with a session manager, and connecting (620) to the cloud service system to obtain a cloud service, sending (630) a device identifier to the session manager that identifies the mobile device on a mobile network receiving (640) a session identifier from the session manager, sending (650) the session identifier to the cloud service system.

Many different ways of executing the methods are possible, as will be apparent to a person skilled in the art. For example, the order of the steps can be performed in the shown order, but the order of the steps can be varied or some steps may be executed in parallel. Moreover, in between steps other method steps may be inserted. The inserted steps may represent refinements of the method such as described herein, or may be unrelated to the method. For example, some steps may be executed, at least partially, in parallel. Moreover, a given step may not have finished completely before a next step is started.

Embodiments of the methods may be executed using software, which comprises instructions for causing a processor system to perform method 400, 500 and/or 600. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

In the following further embodiments are described in the context of a telecommunication network adhering to one or more 5G 3GPP and related standards. For example, the embodiments below may be implemented in the mobile network and/or data network shown in FIGS. 1*a* and/or 1*b*. They could be implemented using the devices and/or systems of FIGS. 1*a*-1*c*.

Figure 3A:
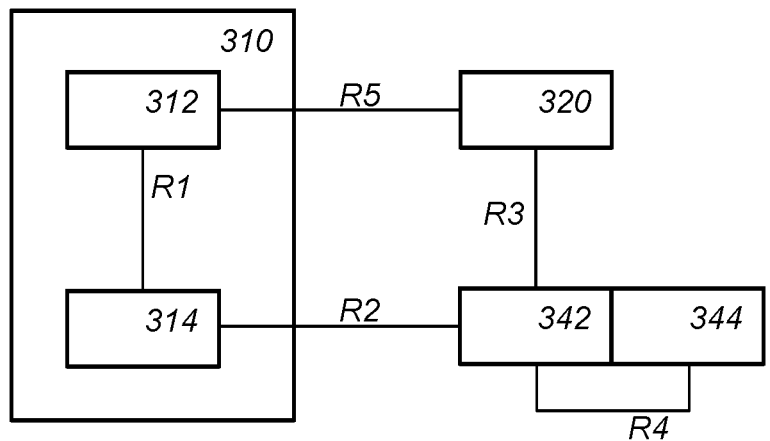

FIG. 3*a* schematically shows an example of an embodiment of an edge computing system. FIG. 3*a* shows a user equipment 310, e.g., a mobile device. The user equipment may be a mobile phone, a vehicle, an IoT device, etc. On user equipment 310 there may be an application instance 312, e.g., a cloud application, and a session handler 314. FIG. 3*a* also shows a cloud service 320. For example, cloud service 320 may interact with application instance 312 to deliver a cloud service to mobile device 310. FIG. 3*a* shows a session AF 342 and a MEC orchestrator 344. The session AF may be a session manager, e.g., implemented as an AF.

FIG. 3*a* also shows possible interfaces R1-R5 between the different components. Interfaces R2, R3 and R5 may be implemented as computer network interfaces, e.g., connections, e.g., Internet connections. Interface R1 may be an internal API. Interface R4 may be an internal API or a computer network connection. In addition to the interfaces shown there may be additional interfaces, e.g., interfaces between components and the core mobile network.

In an embodiment, the interfaces towards the UE and CS may be implemented as an extension of the MEC orchestrator. The MEC orchestrator may act as AF in the 5G Core network, thus it can interact with the AMF and SMF to obtain information about the PDU session of the selected UEs, such that it can influence the UPF for the selected PDU sessions. As such, the MEC orchestrator may be a Session AF, which maintains sessions between application instances on UEs, the CS, and other functions in the MEC orchestrator. In another embodiment, the interfaces belong to an additional Session AF, where the Session AF triggers the instantiation of MEC resources and UPF (re-)selection and traffic routing via the MEC orchestrator. The separated Session AF is preferably located near the MEC orchestrator.

FIG. 3*a* shows the reference points between the application instance and the UE (R1), the UE and the Session AF (R2), the CS and the Session AF (R3), the Session AF with the functions in the MEC orchestrator (R4), and the application instance and the CS (R5). In addition to these reference points, the Session AF may interact with the functions in the mobile network, e.g., the 5G Core network via the Nnef or Namf/Nsmf reference points of the 5G SBA. This means that the Session AF may have interfaces both to the internal 5G Core network and the public Internet.

In an embodiment, the Application Instance and Session Handler are two separated components on the UE. The Application Instance may be specific software, and the Session Handler may be a generic function that can be used by multiple Application Instances. For example, the Session Handler may be implemented as a function of the Operating System (OS) of the UE, R1 being an API exposed by the OS. In another embodiment, the Session Handler is part of the Application Instance, e.g., the Application Instance may implement the Session Handler. In that case R1 is an internal API within the Application Instance.

Below an exemplifying possible interaction between the components is shown. In this procedure the CS and the Session AF obtain a common identification for UEs, such that the MEC Orchestrator can be instructed to initiate computing on the MEC infrastructure and/or configure UPF (re-)selection and traffic routing. Many elements are optional or can be implemented in alternative ways, as is also shown herein. The procedure is detailed below:

1. An Application Instance that is running on the UE is connected to a CS via R5. The implementation of this interface is under de the control of the CS provider. The CS provider may be the same entity as the MNO, but typically is a different entity. The CS may be located within the MNO network or may be accessible via the public Internet, etc.
2. The Application Instance requests, via R1, the Session Handler on the UE to establish a session with the Session AF.
3. The Session Handler establishes a session with the Session AF via R2.
4. The Session AF obtains information to identify the UE, e.g., the PDU session, and determine its location, e.g., the Tracking Area, in the network by obtaining information from the AMF. Then, the Session AF generates an identifier for the Application Instance and maps this identifier to the UE and location.
5. The Session AF notifies the Session Handler on the UE via R2 about the session identifier.
6. The Application Instance on the UE obtains the session identifier from the Session Handler.
7. The Application Instance communicates the session identifier to the CS via R5.
8. The CS determines that the Application Instance requires resources on a MEC instance. As a reaction to this, the CS requests the deployment of edge computing resources near the affected UE. The CS makes this request to the Session AF via R3.
9. The Session AF may validate the request from CS, e.g., to prevent fraud, and when approved, the Session AF interacts with the MEC Orchestrator to initiate edge computing for the specified UE.
10. The MEC Orchestrator checks if deployment of a new VM is necessary since there may already be a VM running that can be used by the UE as well. The MEC Orchestrator instantiates a new VM on a close MEC instance if needed. The MEC Orchestrator interacts with the 5G Core network to (re-)select a UPF and configures traffic routing to the MEC.
11. After instantiation, the Session AF provides the CS via R3 with the location, e.g., a URL, to the just instantiated resources on the MEC instance.
12. Depending on the application and connectivity to the CS, the CS may notify the Application Instance via R5 about the location of the MEC resources.
13. The Application Instance connects to the MEC resources.

The exchange of UE identifiers, allow the CS and the Session AF to address a UE using an identifier. In steps 2-5, the Application Instance obtains the identifier from the Session AF. The Application Instance calls an API on the Session Handler, which creates a new session at the Session AF using an API exposed by the Session AF. In an embodiment, this API is a HTTP RESTful API. In this case, session establishment may be accomplished by sending an HTTP POST request to the Session AF. After receiving the request, the Session AF obtains UE information and generates an identifier (step 4). The response to the HTTP POST then contains this session identifier (step 5). The response may, for example, be formatted using common JSON or XML formats.

When the application instance is no longer active, the Session Handler terminates the session, e.g., using a HTTP DELETE request to the Session AF. In response to this HTTP DELETE request, the Session AF may instruct the MEC Orchestrator to remove the traffic routing to the MEC server. Additionally, the MEC Orchestrator may terminate the MEC resource, e.g., the VM instance, depending on other usage of the resource. In an embodiment, the MEC resources are exclusively used by one UE. When terminating the session, the MEC Orchestrator may also terminate the resources. In another embodiment, the MEC resources are used by multiple UEs. In this case, the MEC Orchestrator only terminates the MEC resources when they are no longer used by any UE, or when the CS provides the instructions to terminate the MEC resources.

In addition to the API exposed on the mobile network, the Session AF may also expose an API on the Internet towards the CS. In an embodiment, the API may be an HTTP RESTful API. The CS can request edge resources using an HTTP POST request to the Session AF, providing one or more identifiers of UEs selected for edge computing. In an embodiment, the Session AF and CS may have pre-established which instance to start on the MEC, e.g., the image of the VM to be started. In this case, sending only identifiers could be sufficient for the Session AF to instruct the MEC Orchestrator. In another embodiment, the CS can dynamically provide resources. In this case, besides the list of identifiers, the CS may provide the Session AF with a reference to the resources to be instantiated. This reference may be an image name to be downloaded from a common repository, e.g., a Docker Hub in the case that the image is a Docker container, or an URL where the image can be downloaded, etc.

Depending on the time it takes to instantiate the MEC resources, the location of the resources, e.g., a URL or IP address, etc., may be provided in the response of the HTTP POST request. When the instantiation takes longer, e.g., in the order of minutes instead of seconds, the response of the HTTP POST request may contain a URL to a HTTP REST resource, which the CS could use for checking the availability and location of the MEC resources. The URL to the HTTP REST resource may be provided using the "Location" header field or as part of the response body.

The procedure that the CS may use to determine whether an application on a UE benefits from using edge computing are depend on the type of application and which service the CS offers on the edge node. In an embodiment, the application relies on heavy computing resources that may not be available on a UE, e.g., complex video analysis. For such applications, edge computing is immediately beneficial. In this embodiment, the CS may request resources from the Session AF directly after the application provides the CS with the session identifier.

In another embodiment, the application may use the MEC for local content distribution, e.g., a "prosumer" application where users can both upload and download live streams from a local event. When the number of users is low and the connection to the CS is adequate, using the MEC is not necessary and the service can be provided directly via the CS. However, when the number of users is increasing, thus increasing the probability that users will consume the content produced by other users, using a MEC for local distribution can reduce network congestion and increase distribution performance. In this embodiment, the CS may detect a peak in demand originating from a certain location. In an embodiment, the CS may use knowledge of its infrastructure, e.g., based on the server instance location of the CS that is reached by the UEs. In another embodiment, the CS may use knowledge about the network, e.g., based on the source IP addresses of the UEs reaching the CS. In yet another embodiment, the CS may use information specifically provided by the application on the UE. For example, the application may provide the CS with location information obtained from the CS. Alternatively, the application may communicate 5G network level parameters, such as the Tracking Area or Cell identifier, to the CS. A combination of these methods is also possible.

Following the procedure defined above, the CS determines whether edge computing resources in a MEC instance are needed. In this embodiment, the CS may use knowledge about the application and the device that the application is running on to make this decision. For example, when a user starts a graphical application that requires heavy computation on the GPU of the device, but the device does not have this capability. The CS can decide to instantiate the edge resources.

When the application has high bandwidth requirements, the CS can decide to offload to the MEC when it notices problems with the delivery of the content, e.g., an increase in packet loss and/or lower than required throughput. Performance problems can both be caused by network congestion between the UE and the CS, or because of available of computing resources at the CS. Then, depending on the source and destination of the traffic flows, the CS can select UEs for edge computing to alleviate the performance problems.

Even if the CS may have the information on how a service can be improved by edge computing, the network provider can assist the CS in monitoring for network congestion problems. In an embodiment, the CS subscribes to the notification from the Session AF. The CS may provide network level information, e.g., a list of IP addresses and port numbers which are used by the CS. When network congestion is detected, the Session AF may inform CSs that are causing the network congestion by means of a notification. Following the notification, a CS may select one or more UEs as suitable candidates for edge computing, and instantiate edge computing according to steps 8-13 from the above described procedure.

In an embodiment, there is no relation between UEs. UEs may use MEC resources for uses such as, cloud rendering of games, or processing sensor data from connected vehicles before uploading metadata to the cloud, etc. In an embodiment, the MEC Orchestrator deploys the service on the MEC instance located close to the UE. By using a close, e.g., the closest MEC instance, e.g., edge node, latency and network congestion can be reduced the most. In another embodiment, the MEC Orchestrator may use information about the load on the MEC infrastructure, and may decide to use a different MEC instance for load balancing purposes.

In another embodiment, UEs have a relation. This is likely to be case when edge computing is used for local content distribution. For example, distribution can be localized when one UE produces a live video stream which is consumed by another UE connected to the same base station or a UE that would be served by the same MEC.

Figure 3B:
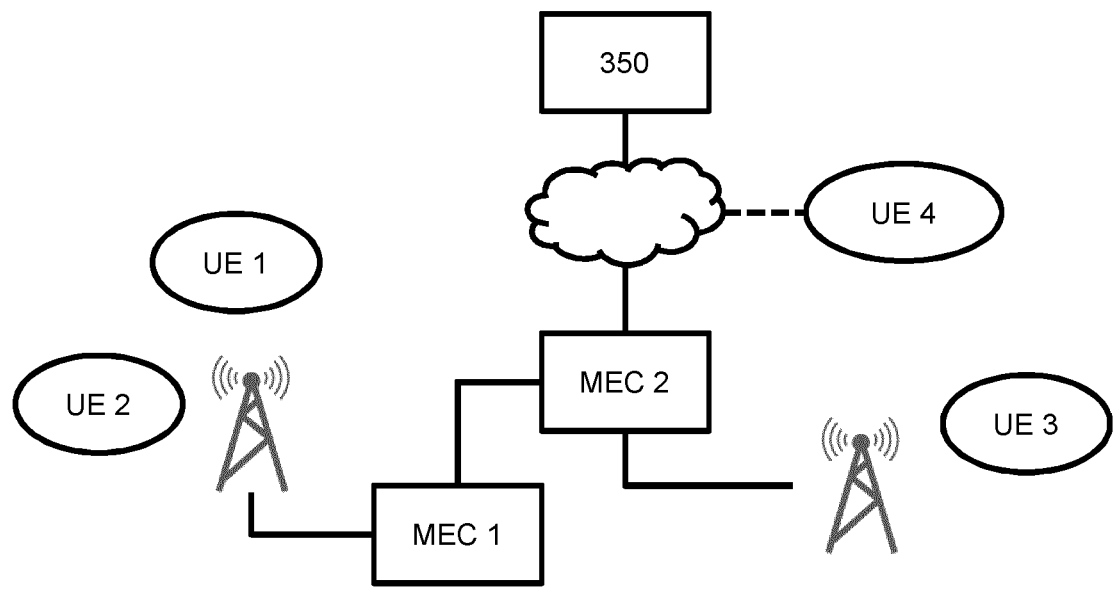

FIG. 3b schematically shows an example of an embodiment of an hierarchical edge computing system. FIG. 3b shows a hierarchical deployment of MEC instances and four UEs connecting at different locations. For example, when UE 1 and UE 2 are related, e.g., UE 1 live streams a video to UE 2, then MEC 1 would be the optimal MEC instance. However, when UE 1 and UE 3 are related, the instance MEC 2 that is further upstream would be preferable. When UE 1 and UE 4 are related, where UE 4 is externally connected via the Internet, using edge computing for localizing content distribution is not beneficial, and distribution may go via the cloud 350.

To define the relations between the UEs, the CS may provide the Session AF, in addition to the identifiers for UEs selected for edge computing, the relation between the UEs. In one embodiment, the CS makes list of UEs that ideally would be connected to the same MEC instance. In another embodiment, the CS uses graph-based definitions. For example, when the API between the Session AF and the CS uses JSON for formatting body content, the relations between the UEs can be expressed using the JSON Graph Format (JGF).

Typically, the CS is unaware of the underlying network infrastructure and MEC instance deployments, so in an embodiment, the UE relations are a recommendation. It is up to the Session AF and/or the MEC Orchestrator to create a mapping between related UEs and the infrastructure.

Depending on the application, application instances on the UE may connect differently to the CS and MEC resources. In an embodiment, the UE uses connection-less communication, e.g., by using UDP for a transaction, or may use short-lived connections, e.g., by creating a new TCP connection for every transaction. In this case, the traffic can be redirected to the MEC by rerouting packets to the MEC, or by updating the DNS entry to the MEC. This approach does not need to actively involve the application instance.

In another embodiment, the application instance maintains a long-lived connection, e.g., a long-lived TCP connection, with the CS. When a UE is selected for edge computing, the connection to the CS may be terminated and re-established to the MEC. In this case, the CS may notify the application instance on the selected UE that it has to re-establish its connection. The CS may provide the application with the location, e.g., URL or IP address, of the MEC resource when given the notification.

Interestingly, in embodiments, the request for additional edge node resources is initiated by the cloud service, which may be unaware of the location or the connections that is client, e.g., the mobile device has.

It will be appreciated that the presently disclosed subject matter also extends to computer programs, particularly computer programs on or in a carrier, adapted for putting the presently disclosed subject matter into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the devices, units and/or parts of at least one of the systems and/or products set forth.

Figure 7A:
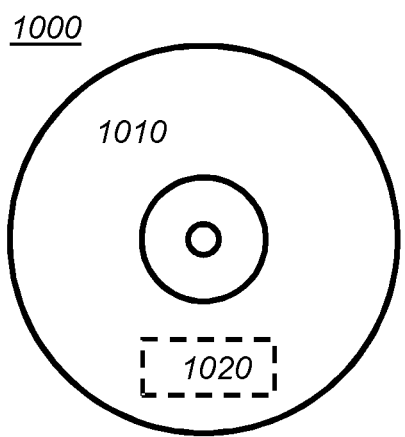

FIG. 7a shows a computer readable medium 1000 having a writable part 1010 comprising a computer program 1020, the computer program 1020 comprising instructions for causing a processor system to perform a session management method, a cloud service method, and/or a mobile device method, according to an embodiment. The computer program 1020 may be embodied on the computer readable medium 1000 as physical marks or by magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said session management method, a cloud service method, and/or a mobile device method.

Figure 7B:
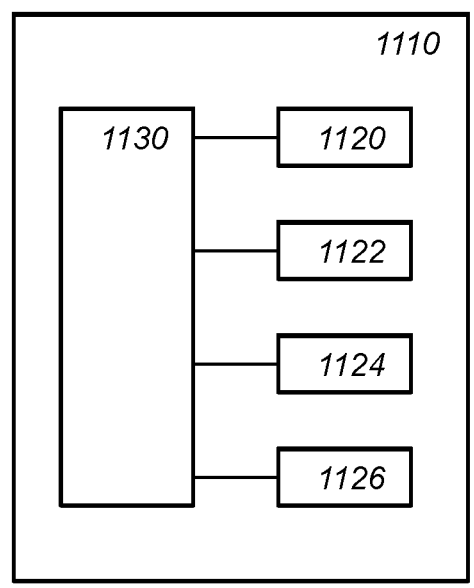

FIG. 7b shows in a schematic representation of a processor system 1140 according to an embodiment of a session manager, a cloud service system, and/or a mobile device. The processor system comprises one or more integrated circuits 1110. The architecture of the one or more integrated circuits 1110 is schematically shown in FIG. 7b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., the session manager, cloud service system, and/or mobile device, may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

It should be noted that the above-mentioned embodiments illustrate rather than limit the presently disclosed subject matter, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The presently disclosed subject matter may be implemented by hardware comprising several distinct elements, and by a suitably programmed computer. In the device claim enumerating several parts, several of these parts may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A session manager configured for managing an edge computing resource in a mobile network, wherein the mobile network comprises edge nodes which are configurable to provide edge computing resources to mobile devices, wherein the session manager comprises:
   a data network interface configured to establish a connection with a mobile device and with a cloud service system, and
   a processor system configured to:
      receive a device identifier from the mobile device that identifies the mobile device on the mobile network,
      obtain a location of the mobile device in the mobile network using the device identifier,
      generate a session identifier for the mobile device and associate the session identifier with the mobile device,
      send the session identifier to the mobile device, the mobile device being configured to forward the session identifier to the cloud service system,
      receive a request from the cloud service system for deployment of an edge computing resource for the mobile device on an edge node, wherein the request identifies the mobile device with the session identifier,
      select an edge node for the mobile device in dependence on the location,
      initiate the edge computing resource for the mobile device on the edge node;
      send a data network address of the initiated edge computing resource on the edge node to the cloud service system, and/or
      send a reconfiguration message to a routing interface from the mobile network to a data network, the routing interface being associated with the mobile device and/or the edge node to route traffic to the initiated edge computing resource.

2. The session manager as in claim 1, wherein the processor system of the session manager is configured to:
   collect mobile network level information for the cloud service system from the mobile network to indicate network congestion to the cloud service system.

3. The session manager as in claim 1, comprising:
   a mobile network interface configured to establish a connection with the mobile network, wherein the processor system is configured to obtain the location of the mobile device via the mobile network interface to the mobile network.

4. An edge computing manager comprising the session manager of claim 1, the edge computing manager being configured to:
   start a virtual machine on the edge node, the virtual machine supporting the edge computing resources for the mobile device on the edge node, and
   configure traffic routing from the mobile device to the edge node.

5. A cloud service system comprising:
   a data network interface configured to establish a connection with a mobile device and with a session manager, and
   a processor system configured to:
      connect to the mobile device to provide a cloud service,
      receive a session identifier from the mobile device, the session identifier being associated to the mobile device through the session manager,
      determine a need for an edge computing resource for the mobile device,
      send a request to the session manager for deployment of the edge computing resource for the mobile device on an edge node, wherein the request identifies the mobile device with the session identifier,
      receive from the session manager a data network address of an initiated edge computing resource, and
      send the data network address to the mobile device.

6. The cloud service system as in claim 5, wherein the processor system of the cloud service system is configured to:
   send a request to the session manager for information indicating mobile network congestion, the request comprising data network information identifying one or more network flows to servers of the cloud service system,
   receive a network congestion report from the session manager when network congestion is detected for a server,
   select one or more mobile devices connected to the server, and
   send a request for deployment of the edge computing resource for the one or more mobile devices.

7. The cloud service system as in claim 5, wherein the request comprises multiple session identifiers identifying multiple mobile devices and determining the need comprises detecting a peak in demand originating from a location in a mobile network associated with the multiple mobile devices, wherein determining the peak in demand comprises:
   determining a peak in demand originating from a particular server instance of the cloud service system to which the multiple mobile devices connect, and/or
   determining a common location of the multiple mobile devices from data network addresses used by the multiple mobile devices, and/or
   receiving geographical information from the multiple mobile devices and determining a peak in demand originating from the multiple mobile devices having matching geographical information, and
   receiving location information for the multiple mobile devices in the mobile network and determining a peak in demand originating from the multiple mobile devices having matching location information.

8. A mobile device comprising:

a data network interface configured to establish a connection with a cloud service system and with a session manager, and a processor system configured to:
  connect to the cloud service system to obtain a cloud service,
  send a device identifier to the session manager that identifies the mobile device on a mobile network,
  receive a session identifier from the session manager,
  send the session identifier to the cloud service system, wherein the cloud service system receives a data network address of an initiated edge computing resource from the session manager, and
  receive from the cloud service system the data network address of the initiated edge computing resource.

9. The mobile device as in claim 8, wherein the processor system is configured for a cloud application and an operating system, the operating system being configured to:
  send the device identifier to the session manager that identifies the mobile device on a mobile network, and
  receive the session identifier from the session manager, and the cloud application being configured to:
  obtain the session identifier from the operating system and to send the session identifier to the cloud service system.

10. A session management method for managing an edge computing resource in a mobile network, wherein the mobile network comprises edge nodes which are configurable to provide edge computing resources to mobile devices, wherein the session management method comprises:
  establishing a connection with a mobile device and with a cloud service system,
  receiving a device identifier from the mobile device that identifies the mobile device on the mobile network,
  obtaining a location of the mobile device in the mobile network using the device identifier,
  generating a session identifier for the mobile device and associate the session identifier with the mobile device,
  sending the session identifier to the mobile device, the mobile device being configured to forward the session identifier to the cloud service system,
  receiving a request from the cloud service system for deployment of an edge computing resource for the mobile device on an edge node, wherein the request identifies the mobile device with the session identifier,
  selecting an edge node for the mobile device in dependence on the location,
  initiating the edge computing resource for the mobile device on the edge node,
  sending a data network address of the initiated edge computing resource on the edge node to the cloud service system, and/or
  sending a reconfiguration message to a routing interface from the mobile network to a data network, the routing interface being associated with the mobile device and/or the edge node to route traffic to the initiated edge computing resource.

11. A non-transitory computer readable medium comprising data representing instructions, which when executed by a processor system, cause the processor system to perform the method according to claim 10.

12. A cloud service method comprising:
  establishing a connection with a mobile device and with a session manager, and
  connecting to the mobile device to provide a cloud service,
  receiving a session identifier from the mobile device, the session identifier being associated to the mobile device through the session manager,
  determining a need for an edge computing resource for the mobile device,
  sending a request to the session manager for deployment of the edge computing resource for the mobile device on an edge node, wherein the request identifies the mobile device with the session identifier,
  receiving from the session manager a data network address of an initiated edge computing resource, and
  sending the data network address to the mobile device.

13. A mobile device method comprising:
  establishing a connection with a cloud service system and with a session manager, and
  connecting to the cloud service system to obtain a cloud service,
  sending a device identifier to the session manager that identifies the mobile device on a mobile network,
  receiving a session identifier from the session manager,
  sending the session identifier to the cloud service system, wherein the cloud service system receives a data network address of an initiated edge computing resource from the session manager, and
  receiving from the cloud service system the data network address of the initiated edge computing resource.

\* \* \* \* \*